Sept. 29, 1959 J. B. BLOMSTEDT ET AL 2,906,966

CATHODE CONNECTED LC-OSCILLATOR

Filed May 4, 1955

INVENTORS
JOHN BÖRJE BLOMSTEDT
ERIK HERBERT OLOFSSON
BY [signature]
ATTORNEY

United States Patent Office 2,906,966

Patented Sept. 29, 1959

2,906,966

CATHODE CONNECTED LC-OSCILLATOR

John Börje Blomstedt and Erik Herbert Olofsson, Johanneshov, Sweden, assignors to Telefonaktiebolaget L M Ericsson, Stockholm, Sweden, a corporation of Sweden Application May 4, 1955, Serial No. 506,006

Claims priority, application Sweden May 25, 1954

5 Claims. (Cl. 331—176)

In LC–oscillators it is desirable, that the frequency is controlled by the LC-circuit, and that variations in amplifier tubes, other circuit elements, load and feeding voltages do not materially influence the frequency. A general requirement is that the oscillator construction is as simple and cheap as possible, and that it should consequently take advantage of the amplifying and effect producing capacity of the amplifier in the oscillator in the most economic way.

The above mentioned requirements are best fulfilled by using an oscillator regulated by a thermistor. Such an oscillator also keeps the output voltage within narrow limits. An oscillator regulated by a thermistor according to the present invention is more satisfactory than previously known constructions as to the requirement of simple structure and effectively controlling the characteristics of the amplifier comprised therein, at least when the desired frequency stability does not exceed $1:10^4$–$10^5$ and the oscillating frequency is not too high (for instance 100 kc.). The oscillator according to the invention has also lower power consumption than that of previously known constructions of that kind.

A thermistor controlled oscillator according to the invention comprises an amplifier to the output of which a transformer winding is connected in parallel. The oscillator further comprises a thermistor with positive resistance-current characteristic and a frequency controlling network having two parallel branches. This network is connected across the input side and the output side of the amplifier. The thermistor is connected to the transformer winding and to one of the branches of the frequency controlling network at points intermediate to the terminals of the transformer winding and the respective network branch.

The invention will be described more in detail in connection with the attached drawings.

1 designates an amplifier with the output voltage $U_1$ and the input voltage $U_3$. The amplifier is so arranged that the feed-back voltage is the difference between the output voltage $U_1$ and the voltage $U_2$ through an oscillating circuit consisting of a coil 4 in parallel with a condenser 5. Thus the voltage fed to the input of the amplifier is $U_3=U_2-U_1$ and the amplification$=U_1/U_3$.

The voltage through the oscillating circuit is obtained by voltage division from the output of the amplifier by means of a transformer 2 and a thermistor 3. The thermistor which should have positive resistance-current characteristic is connected to an output circuit and to an oscillating circuit with suitable transformation, the ratios being so chosen that the energy transmitted to the oscillating circuit is only a small part of that which is consumed in the thermistor. The transformer may suitably consist of the output transformer of the amplifier and may possibly be provided with a special winding for connection of the load of the oscillator.

Figures 1, 2:
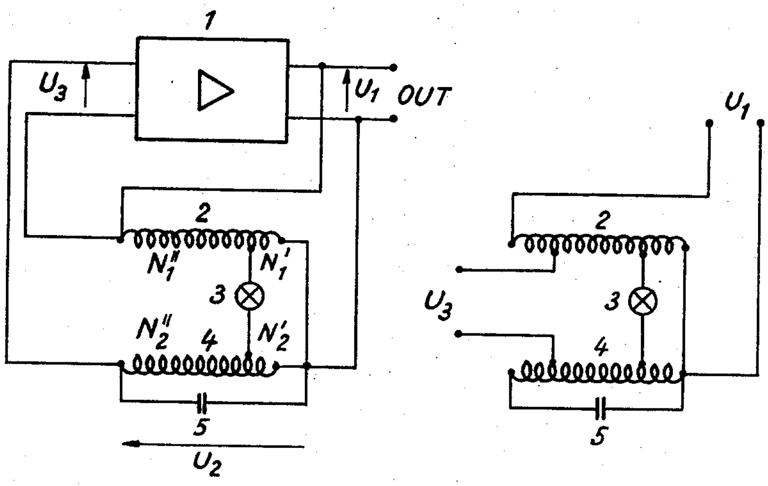
Fig. 1 is a circuit diagram showing the basic arrangement of an oscillator functioning as an LC–oscillator.
Fig. 2 is a modification of Fig. 1 and more specifically of the feed-back network of the system.

In the arrangement according to Fig. 1 the ratio in the transformer is obtained $$n_1=\frac{N_1^{\text{I}}}{N_1^{\text{II}}+N_1^{\text{I}}}$$

and the ratio in the coil of the oscillating circuit $$n_2=\frac{N_2^{\text{I}}}{N_2^{\text{II}}+N_2^{\text{I}}}$$

Suppose that the resonance frequency of the oscillating circuit is $\omega$, the inductance L, the capacity C and the Q-value Q. Said Q-value may for the sake of simplicity be represented by a resistance connected in parallel. Suppose further that the resistance and the current of the thermistor in the most suitable working point are R respectively I.

The relation between the output voltage $U_1$ of the amplifier and the voltage $U_2$ through the oscillating circuit is then obtained $$U_1\cdot n_1\cdot\frac{n_2^2\cdot Q\cdot\omega L}{R+n_2^2Q\omega L}=n_2U_2$$

If $n_2^2Q\omega L<<R_1$ i.e. if the resonance impedance of the oscillating circuit transformed to the thermistor circuit is small in relation to the impedance of the thermistor or, in other words, if the energy transmitted to the oscillating circuit is small in relation to the energy consumed in the thermistor, $U_2$ is directly proportional to the impedance of the oscillating circuit and reversely proportional to the impedance of the thermistor. In this way the regulating capacity of the oscillating circuit and of the thermistor is used in the best way and causes the greatest possible percental changes of $U_2$. Said changes are then exploited by balancing against $U_1$.

Fig. 2 shows another embodiment of the invention the feed-back network having such a shape that the feedback voltages are chosen with a suitable transformation in order to fit the impedance of the amplifier.

Figure 3:
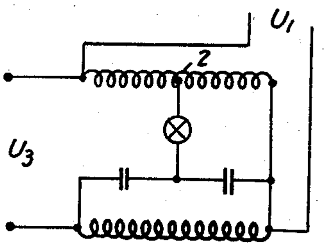
Fig. 3 is another modification of the system showing the connection of the thermistor to the LC circuit by means of a capacitative voltage device.
Figure 4:
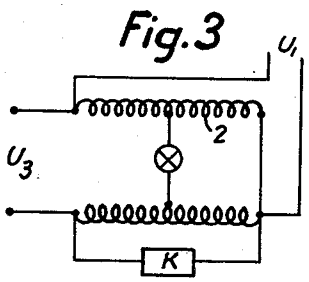
Fig. 4 is a modification of the circuit system showing the connection of the oscillating circuit by means of an autotransformer.

Fig. 3 shows an embodiment of the invention, in which the thermistor is connected to the LC–circuit by means of a capacitative voltage division, and Fig. 4 shows a connection of the oscillating circuit for instance a crystal K by means of an autotransformer.

Figure 5:
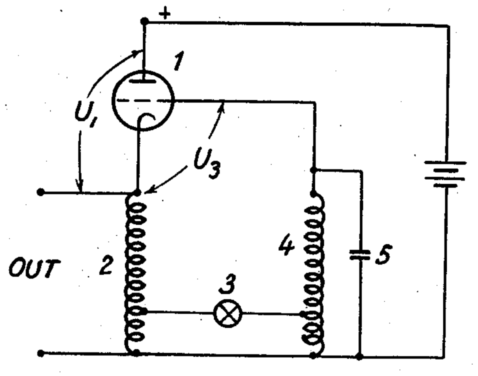
Fig. 5 is a modification of the system showing a different arrangement of the oscillator.

Fig. 5 shows a special embodiment of the oscillator, the amplifier consisting of only one tube 1, to the cathode of which the output transformer 2 is connected. The resistance in the transformer is such that it is suitable as a cathode resistance for automatic grid bias voltage. If it is desirable the grid bias voltage may of course be arranged in another way. As regards the tube capacitances the connection has the same advantages as a cathode connected amplifier. The influence of the grid capacitance upon the grid circuit is reduced $(1+F)$ times, F being the voltage amplification of the tube. The grid-anode-capacitance appears over the grid circuit without being increased by the anode feed-back. In the mentioned circuit part of the anode direct current flows evidently through the thermistor. Said current may naturally be blocked by a condenser, but if the amplified tube has such characteristics that amplification and anode direct current follow each other to some extent in case of ageing, tube exchange and anode voltage changes, said current will at suitable dimension still more improve the adjusting capacity of the thermistor. The accurate adjustment of the output voltage of the oscillator is easily obtained by connection of a variable resistance in series with the thermistor. The resistance, however, deteriorates the adjusting capacity of the thermistor, if it is too great.

It is also possible that the thermistor is connected over a transformer, which transforms the impedance of the thermistor into the desired value. This causes, however, an increased consumption of material in the form of said additional transformer, and the cost for the production is increased.

The invention is naturally not limited to the present special embodiment but may be varied in many different manners within the scope of the invention.

We claim:

1. A thermistor controlled oscillator comprising amplifying means having an input and an output side, a transformer winding connected in parallel to the output side of said amplifying means, a thermistor having a positive resistance-current characteristic and a frequency controlling network including two parallel branches, said network being connected across the input and output side of said amplifying means, and said thermistor being connected between the transformer winding and one of said network branches at points intermediate to the terminals of the winding and the respective network branch.

2. An oscillator according to claim 1 wherein one of said parallel network branches includes a winding and the other a capacitance means, said thermistor being connected to the network branch including said winding.

3. An oscillator according to claim 1 wherein one of said parallel network branches includes a winding and the other a capacitance means, said thermistor being connected to the network branch including said capacitance means.

4. An oscillator according to claim 1 wherein said amplifying means comprise an anode, a cathode and a control grid, said transformer winding being connected between the cathode and ground, said network being connected between the control grid and ground, and said anode being connected to a source of positive voltage, and wherein one of said parallel network branches includes a winding and the other a capacitance means.

5. An oscillator according to claim 4 wherein said thermistor is connected to the network branch including said winding.

References Cited in the file of this patent

UNITED STATES PATENTS

| | | |
|---|---|---|
| 1,563,620 | Gorton | Dec. 1, 1925 |
| 2,111,086 | Basim | Mar. 15, 1938 |
| 2,124,595 | Seaman et al. | July 26, 1938 |
| 2,495,177 | Norde | Jan. 17, 1950 |